Dec. 3, 1968  W. D. JEFFERS  3,413,749

COMPARTMENTED FISH LURE

Filed May 11, 1966

INVENTOR.
WILLIAM D. JEFFERS
BY
Townsend and Townsend
ATTORNEYS

United States Patent Office 3,413,749
Patented Dec. 3, 1968

3,413,749
COMPARTMENTED FISH LURE
William D. Jeffers, Fresno, Calif., assignor to
Jeffers & Bailey, Inc., Fresno, Calif.
Filed May 11, 1966, Ser. No. 549,347
6 Claims. (Cl. 43—42.06)

ABSTRACT OF THE DISCLOSURE

A fish lure including a body having a cavity, and an indentation extending outwardly therefrom, for receiving a perforable capsule filled with a fish-attracting fluid. The capsule includes an extension for alignment wholly within the indentation for releasing a stream of fish-attracting fluid when the lure is moved through a body of water. A fish hook is integrally attached to a portion of the lure body.

---

The present invention relates to an improved fish lure and, more particularly, to a lure containing a compartment for releasably holding a capsule of fish-attracting fluid.

The art of angling through the employment of artificial lures is of ancient vintage. Much time and untold sums of money have been expended in developing various types of lures in many modified physical configurations in an effort to attract the unsuspecting fish. However, none of the known prior art devices discloses a lure in which a fish-attracting fluid can be releasably retained so that as the lure is drawn through the water, the fluid will be allowed to stream out behind the lure to attract fish through the taste and smell of the fluid.

It is a principal object of this invention to provide an artificial fish lure which slowly dispenses fish-attracting fluid as it is drawn through a body of water.

It is a feature and advantage of this invention to provide an artificial fish lure including a body having a cavity for receiving a perforable capsule which will, when perforated, release a stream of fish-attracting fluid.

It is a further feature and advantage of this invention to provide an artificial fish lure having a unitary resilient elongated body containing a closable cavity of an appropriate size to maintain therein a perforable fluid-containing capsule. By inserting the capsule into the cavity within the body and perforating a wall of the capsule just prior to employing the lure for fishing, the fish-attracting fluid is dispersed from the cavity as a stream into the surrounding water environment. Fish, attracted by the smell and taste of the fluid, are motivated to strike the lure.

It is still a further feature and advantage of this invention to provide an artificial fish lure constructed so as to contain a weed guard for the hook attached integrally with the lure body.

These objects, features and advantages will be better understood and others will become apparent from the following description of the invention, especially when reference is made to the accompanying drawing, wherein.

Referring now to the drawing in which similar characters of reference represent corresponding parts in each of the several views, there is a fishhook A having partially molded therearound a lure body B which is adapted to receive a fluid-containing capsule C.

Figure 1:
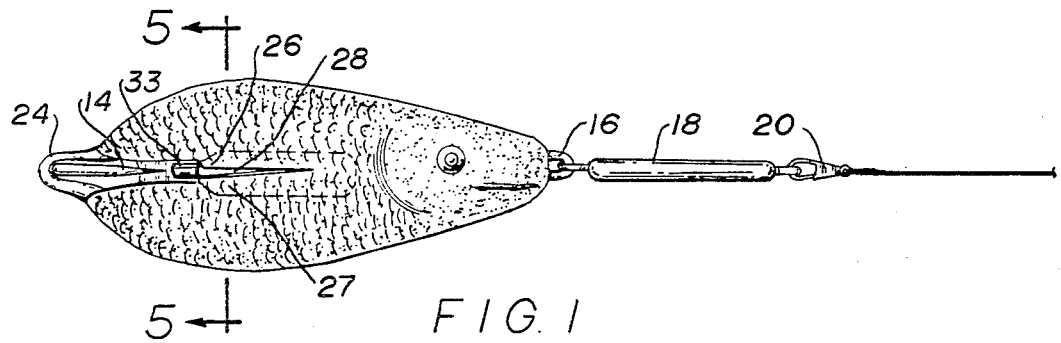
FIG. 1 is a top view illustrating the preferred embodiment of the invention.

Fishhook A includes a shank 10 having at one end thereof a return bend 12 terminating in a barb 14 of more or less conventional form. The opposite end of shank 10 terminates in a line-attaching eye 16 to which can be attached a conventional sinker 18 and leader 20, see FIG. 1, which in turn is attached to a fishing line (not shown).

Figure 2:
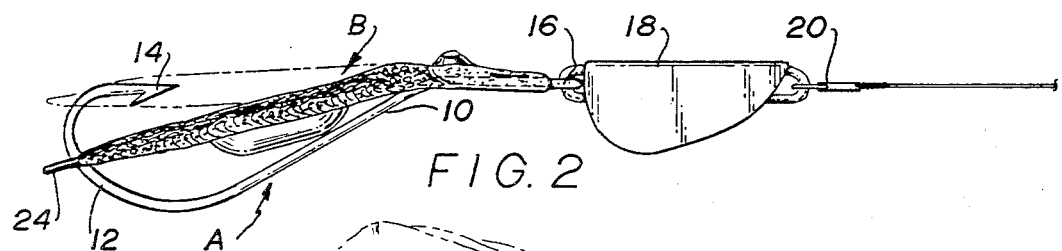
FIG. 2 is a side elevational view illustrating the embodiment of FIG. 1.

Body B, of some suitable material such as thermosetting plastic, terminates at one end in weed deflector 24 normally positioned adjacent barb 14 of fishhook A. At its other end, body B is suitably attached, such as by molding, to a portion of shank 10 near eye 16. Intermediate the ends thereof, body B is provided with a cavity 22 which under normal conditions is substantially completely enclosed by resilient flaps 26 and 27 that are formed integrally of the body. Resilient flaps 26 and 27 confront one another along a slit line 28 to afford access to cavity 22. Body B is further provided with indentation 29 which provides for a portion of capsule C to extend out of cavity 22 as hereinafter described. When body B, and more specifically weed deflecting end 24, is displaced from its normal position as illustrated by FIG. 2, return bend 12 and barb 14 are exposed for contact with the striking fish.

Capsule C is formed with a puncturable outer wall 30 of suitable gelatinous or plastic character, for retaining therein a fish-attracting fluid 32 such as fish oil and the like. Capsule C corresponds in size to cavity 22 and is insertable therein, as is illustrated by FIG. 1. Capsule C is provided with a neck extension 33 which, when capsule C is properly positioned in cavity 22, extends rearwardly of the cavity into indentation 29 and into close proximity with barb 14. Because of the close proximity of the rear extremity of neck extension 33 to barb 14 and because of the bendable nature of lure body B, a fish oil discharge opening can readily be formed by puncturing the neck extension with the hook barb. Of course, it will be apparent to one skilled in this art that capsule C can be perforated in any number of ways, such as by cutting off the end or by providing capsule C with a water-soluble plug which will dissolve when the lure is placed in water.

Figure 3:
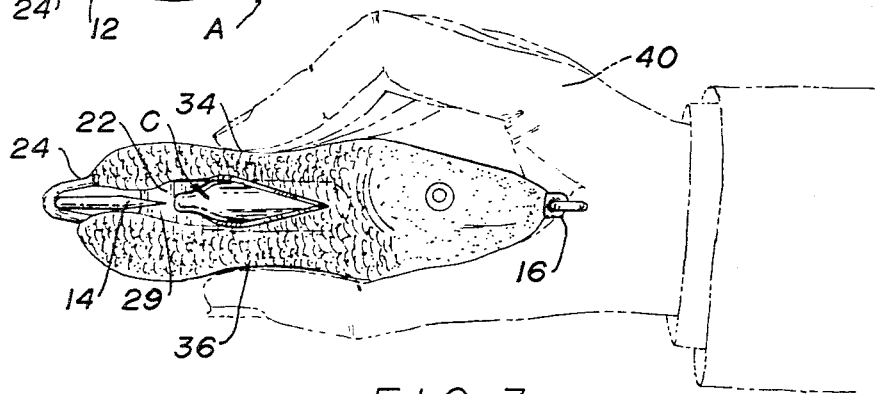
FIG. 3 is a top view illustrating the resiliency of the lure body of FIG. 1.
Figure 4:
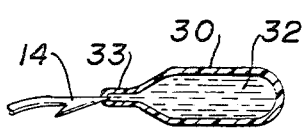
FIG. 4 is a cross-sectional view of a fish-attracting fluid-containing capsule.
Figure 5:
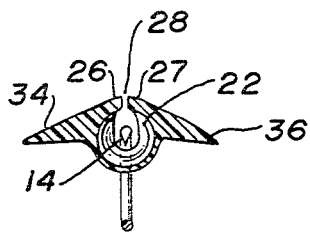
FIG. 5 is a cross-sectional view taken along line 5—5 of FIG. 1.
Figure 6:
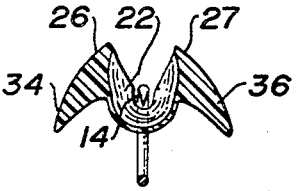
FIG. 6 is a cross-sectional view depicting FIG. 5 in an expanded position.

Referring more specifically to FIG. 3, it is shown that when the sides 34 and 36 of body B are forced downwardly and towards each other, by inward depression such as with human hand 40, flaps 26 and 27 are displaced apart along slit line 28 to expose cavity 22. Capsule C can then either be inserted therein or removed therefrom. When the contents of capsule C are exhausted, it is relatively easy to remove the used capsule and replace it with a fresh capsule.

When the lure is to be employed as intended, the end of neck 33 of capsule C is punctured by barb 14 so that the enclosed fluid is slowly released. The lure is then deposited in the body of water where it is desired to fish. Because of indentation 29 in which neck 33 is positioned, the neck is out of the direct path of the flowing liquid and protected from mechanical damage. Water flow across the body B is altered by the indentation, thereby enhancing the delivery of fluid 32 from capsule C.

What is claimed is:

1. An artificial fish lure comprising: a body having a cavity; a substantially rigid fish hook including a shank, a line-attaching eye integral with the forward portion of said shank, and a return bend having a barbed end integral with the rearward portion of said shank; means securing at least a portion of the shank of said fish hook to the body, said body including an indentation extending along the surface thereof from said cavity towards said barbed end; and a perforable capsule containing releasable fish-attracting fluid, substantially all of said capsule adapted to be positioned within said cavity, the remainder of said capsule adapted to be disposed in said indentation whereby when said fish-attracting fluid is released from said capsule said fluid will stream out of said body.

2. In an artificial fish lure including a lure body having a cavity adapted to receive a capsule releasably containing fish-attracting fluid, the improvement comprising said body having an indentation extending outward from said cavity and an extension on said capsule for alignment wholly within said indentation so that when said extension is perforated, said artificial lure itself will appear to emit said fluid as the lure is moved through a body of water.

3. A fish lure in accordance with claim 1 wherein said body is unitary and elongated.

4. A fish lure in accordance with claim 1 wherein said body is fabricated of a resilient material molded around said shank.

5. A fish lure in accordance with claim 1 wherein said capsule is punctured to release said fluid.

6. A fish lure in accordance with claim 1 wherein said body is formed to cooperate with the return bend of said hook to provide a weed shield for said hook.

References Cited

UNITED STATES PATENTS

| 534,506 | 2/1895 | Hastings | 43—42.1 |
| 2,225,676 | 12/1940 | White | 43—42.06 X |
| 2,235,600 | 3/1941 | Ammerman. | |
| 2,674,058 | 4/1954 | Lindenberg | 43—42.06 |
| 2,913,849 | 11/1959 | Rolstone | 43—42.41 |
| 3,133,373 | 5/1964 | Jeffers | 43—42.41 |
| 3,367,060 | 2/1968 | Abercrombie | 43—42.33 |

FOREIGN PATENTS

| 696,564 | 10/1964 | Canada. |
| Ad. 68,217 | 10/1957 | France. |

SAMUEL KOREN, *Primary Examiner.*

J. H. CZERWONKY, *Assistant Examiner.*